3,790,626
PURIFICATION OF ADIPIC ACID
Hiroyuki Shinohara, Hiroaki Ohashi, and Kazuhiko Konno, Oaza-Wakaguri, Japan, assignors to Mitsubishi Petrochemical Company Limited, Tokyo-to, Japan
No Drawing. Filed Mar. 1, 1971, Ser. No. 120,049
Claims priority, application Japan, Apr. 3, 1970, 45/27,904
Int. Cl. C07c 51/42
U.S. Cl. 260—537 P          6 Claims

ABSTRACT OF THE DISCLOSURE

Raw crystals of adipic acid, prepared by oxidizing cyclohexane, cyclohexanone, cyclohexanol, or mixtures thereof with molecular oxygen are purified by subjecting the same to a nitric-acid treatment, the temperature of the raw crystals of adipic acid being prevented from exceeding 75° C. prior to the nitric-acid treatment, and recrystallizing the resulting adipic acid from water.

BACKGROUND OF THE INVENTION

This invention relates generally to the production of adipic acid and more particularly to a new and advanced process for purifying adipic acid prepared by oxidation of a precursor material thereof with molecular oxygen such as air thereby to produce adipic acid of high purity.

More specifically, this invention relates to a process for purifying adipic acid prepared by oxidizing a starting material of cyclohexane, cyclohexanone, cyclohexanol, or mixtures thereof (i.e., a mixture of two or three thereof) by means of molecular oxygen-containing gas, such as air, in a solvent such as acetic acid thereby to produce adipic acid of polymer grade. The above starting material is hereinafter referred to as "cyclohexane or a partial oxidation product thereof."

Heretofore, the purification of adipic acid prepared by oxidation with air to a product quality equivalent to polymer grade has been considered to be difficult. It may be presumed that this signifies that a low-cost and easy process of industrial value for this purpose has not yet been found. Consequently, adipic acid prepared by an air oxidation process has hitherto been limited in use exclusively to as a plasticizer.

However, the prime use of adipic acid is that for 6.6 nylon polymer, and, accordingly, an inexpensive, easy, and industrially feasible process for purifying adipic acid prepared by an air oxidation process to a purity of polymer grade would be of great industrial worth.

The principal reason why adipic acid prepared by an air oxidation process has heretofore been unsuitable for use in the production of polymers is that it contains impurities which give rise to deleterious coloration at the time of melting, and it has been difficult to remove these impurities in a simple manner.

It seems that there is not much knowledge relating to methods for purifying adipic acid prepared by the air oxidation process. As far as we are aware, the only example is that of purification of adipic acid obtained as a by-product in the production of cyclohexanone and cyclohexanol by air oxidation of cyclohexane, as disclosed in the specification of German Pat. No. 868,901. This method comprises recrystallizing the raw or unrefined adipic acid with an oxygen-containing solvent such as acetic acid, heating and drying the crystals thus obtained, at 105° C. in one example, thereby to remove and recover the solvent, subjecting the crystals further to a high-temperature treatment, at 120° C. in the example, under pressure with nitric acid of a concentration of from 5 to 60 percent, and carrying out recrystallization.

By this purification process, however, since it is terminated by a nitric-acid recrystallization, it can be presumed that the nitric acid radicals remaining in the adipic acid thus formed are extremely numerous, whereby the use of a "purified" adipic acid produced in this manner as an adipic acid of polymer grade is difficult.

The reason for this is that, since the presence of nitric-acid ions can be considered to be a cause of coloration of polymers, the quantity of nitric-acid ions remaining within adipic acid of polymer grade is strictly limited. Furthermore, since nitric-acid ions are considered to be a cause of lowering of the color stability when the adipic acid is melted, it may be considered that this adipic acid has not attained the level of polymer grade also with respect to color at the time of melting.

As an expedient for removing the residual nitric-acid ions, a recrystallization from water after the nitric-acid treatment of the adipic acid prepared by an air oxidation process would appear to be a simple procedure. By this water recrystallization, the removal also of monobasic acids such as the acetic acid used as the oxidation solvent can be expected.

We have found, however, that while recrystallization from water is effective in removing nitric-acid ions, monobasic acids, and other water-soluble impurities, it is almost useless in improving the color at the time of melting. Accordingly, the adipic acid thus obtained is of a quality remote from that of polymer grade.

SUMMARY OF THE INVENTION

It is an object of this invention to overcome the difficulties heretofore encountered. We have found that this object can be achieved by preventing the raw or unrefined adipic acid subjected to nitric-acid treatment and purification by recrystallization from water, from being exposed to high temperatures.

According to the present invention, briefly summarized, there is provided a process for purifying adipic acid, in which raw crystals of adipic acid prepared by oxidation of cyclohexane or a partial oxidation product thereof with molecular oxygen, are then subjected to a nitric-acid treatment at temperatures in the range 90°–150° C., the temperature of the raw crystals of adipic acid being prevented from exceeding 75° C. at any time prior to the nitric-acid treatment, and the resulting adipic acid is then recrystallized from water.

The nature, principle, and utility of this invention will be more clearly apparent from the following detailed description beginning with general aspects and features of the invention and concluding with specific examples of practice illustrating preferred embodiments of the invention.

DETAILED DESCRIPTION

As summarized hereinabove, this invention is based on the combination of three vital conditions, namely: (1) that adipic acid in the state wherein it contains a minute quantity of impurities is not heated excessively; (2) that a nitric-acid treatment is carried out (it may be considered that the impurities are destroyed by this treatment); and (3) that nitric acid, monobasic acids, and other water-soluble impurities are removed by recrystallization from water. The combination of all of these three conditions is crucial, and the full purification effect afforded by the invention cannot be attained if even one of these conditions is not fulfilled.

While the combination or interconnection of these three conditions is important, the first of these conditions is the most unique. No consideration was given to this point in the known purification method as described hereinbefore, and this was a natural result from the special nature of the use of adipic acid. That is, while recrystallization from acetic acid in the known method is effective in removing the coloration substances, when even a minute quantity of a monobasic acid such as acetic acid is contained in adipic acid, it can be presumed that this monobasic acid, in the case where such adipic acid is used to produce a polymer, will give rise to a lowering of the polymerization degree, thereby causing a great lowering of the polymer properties.

It may be considered, therefore, that for this reason, and also for the purpose of solvent recovery, it has been the practice heretofore to heat and dry at, for example, 105° C., the raw crystals of adipic acid prior to the nitric-acid treatment thereby to recover the acetic acid.

According to our findings, however, heating of adipic acid to be treated with nitric acid, which adipic acid still contains impurities, at a temperature above 75° C. to remove acetic acid gives rise to a definitely detrimental effect in the subsequent step of nitric-acid treatment. This suggests that when adipic acid in the state wherein it contains a minute quantity of impurities is subjected to heat treatment, these impurities are transformed into substances which cannot easily be oxidized with nitric acid.

Therefore, when crystals of raw adipic acid of this nature are once heated, a severe condition undoubtedly becomes necessary in the nitric-acid treatment, but a severe condition (160° C. or more) in the presence of nitric acid causes decomposition of the adipic acid itself, thereby giving rise to adipic acid loss and formation of new coloration matter. It may be concluded, therefore, that even when the treatment conditions are made severe with the object of oxidizing and destroying coloration impurities, it is not possible to raise the purification effectiveness above a certain limit.

Thus, the heating and drying of raw adipic acid, as practiced heretofore for removal of monobasic acids and solvent recovery, are actually causes of lowering of the quality of the adipic acid. While this is a surprising result, it was not clearly apparent heretofore, and probably for this reason, it has been erroneously concluded that adipic acid prepared by an air oxidation process cannot be economically purified to a purity of polymer grade.

The third crucial condition of this invention, as mentioned hereinbefore, is recrystallization of the adipic acid from water. With respect to this condition, the practice of recrystallizing, with water, adipic acid prepared by nitric-acid oxidizing of cyclohexanone and cyclohexanol and thereafter using the adipic acid for producing polymers is known. Accordingly, there may be a view that a purification method comprising nitric-acid recrystallization and water recrystallization with respect to adipic aicd prepared by an air oxidation process can be readily anticipated by inference from this known practice. Such a view, however, is not sound for the following reason.

Air oxidation is an autoxidation reaction due to a radical chain mechanism, differing completely from the reaction mechanism of nitric-acid oxidation, and the impurities contained in the air-oxidation adipic acid are also completely different from those resulting in the nitric-acid process.

More specifically, the selectivity of adipic acid prepared by a nitric-acid oxidation process is of the order of from 80 to 90 percent, and the by-products may be considered to be lower dibasic acids and monobasic acids, but these have almost no effect as causes of coloration. In contrast, the selectivity of adipic acid prepared by an air oxidation process is approximately 70 percent, and the by-products comprise, in addition to lower dibasic acids, a considerable quantity of a resinous material which resinous material becomes a cause of a coloration, as described in Japanese patent publication No. 11646/1969.

This resinous material differs from cyclohexanone and cyclohexanol in that it is extremely difficult to accomplish nitric-acid oxidation thereof, and when adipic acid prepared by air oxidation is treated at the generally known optimum temperature of from 60 to 85° C. (as disclosed in U.S. Pat. No. 2,191,786) for nitric-acid oxidation of cyclohexanone and cyclohexanol, no purification effect whatsoever is attained. A purification effect is observable for the first time at a treatment temperature above 90° C.

Thus, the objects of the nitric-acid treatment of adipic acid prepared by an air oxidation process and in the nitric-acid oxidation of cyclohexanone and cyclohexanol are completely different. Moreover, the optimum treatment conditions also differ greatly. Therefore, this nitric-acid treatment of adipic acid prepared by an air oxidation process and this nitric-acid oxidation of cyclohexanone and cyclohexanol are separate techniques respectively with completely different problems to be solved.

A raw adipic acid to which this invention can be effectively applied is one which has been prepared by a process wherein cyclohexane or a partial oxidation product thereof, as defined hereinbefore, is oxidized with molecular oxygen. This process is known irrespective of whether or not production of adipic acid is intended.

More specifically, in the case where the object is to produce adipic acid, the adipic acid is produced by oxidizing cyclohexane or a partial oxidation product thereof in a suitable solvent and in the presence of a suitable catalyst with molecular oxygen-containing gas such as air or pure oxygen. Examples of cyclohexane or partial oxidation product thereof are cyclohexane, cyclohexanone, and cyclohexanol used singly, mixtures of cyclohexane and cyclohexanone, mixtures of cyclohexane and cyclohexanol, and mixtures of cyclohexanone and cyclohexanol. Examples of suitable solvents are organic acids, particularly monobasic acids, e.g., acetic acid. Examples of suitable catalysts are compounds, particularly salts, of metals of variable valence, such as lower monobasic or naphthenic acid salts of Co, Mn, and Cu.

When the reaction liquor is cooled, adipic acid (first crystals) is precipitated. When the mother liquor (first mother liquor) is concentrated and cooled, adipic acid (second crystals) is further precipitated. When the resulting mother liquor (second mother liquor) is subjected to the same crystallization operation, another crop of crystals is precipitated.

In accordance with this invention, the crystals of raw adipic acid prepared in the above described manner are subjected to nitric-acid treatment in their as-prepared state, after washing with water to remove substances such as acetic acid, after removing also substances such as succinic acid and glutaric acid produced as by-products, or after recrystallization from acetic acid in accordance with the teachings of the process described in the German Pat. No. 868,901.

In the case where the oxidation reaction is carried out without a solvent, an even greater purification effect can be attained by recrystallizing beforehand the raw crystals obtained from the oxidation reaction with an oxygen-containing solvent prior to the nitric-acid treatment. Of course, in the case also where the oxidation reaction is carried out with acetic acid as a solvent, the raw crystals may be recrystallized with an oxygen-containing solvent such as acetic acid. However, since the resulting purification effect is not too great, only ample washing with acetic acid, water, or some other liquid is sufficient.

Crystals which have been subjected to a preliminary purification step in this manner are also herein referred to as "raw (or unrefined) crystals of adipic acid prepared by a process step of oxidizing cyclohexane or a partial oxidation product thereof with molecular oxygen." The term "raw crystals of adipic acid" is herein used to designate such crystals in a state wherein substantially no liquid phase exists therein.

In accordance with this invention, with respect to a crucial condition thereof as mentioned hereinbefore, care is exercised to prevent these raw crystals of adipic acid from having a thermal history in which they are heated to a temperature exceeding 75° C., preferably 70° C., prior to their being subjected to the nitric-acid treatment. Accordingly, in the case where some kind of preliminary purification is carried out with respect to adipic acid crystals separated and recovered from an oxidation reaction liquor, for example, removal of the adhering acetic acid, such purification should be carried out at a temperature below 75° C., peferably below 70° C.

For example, when it is desired to remove adhering acetic acid from adipic acid separated and recovered from the oxidation reaction liquor or the mother liquor of recrystallization from acetic acid and not to use the adipic acid directly in its as-recovered state, drying under reduced pressure or in a fluidized-bed at a low temperature (below 70° C., for example, in either case) may be carried out.

When heating and removing of the acetic acid is not carried out in this manner, the admixing of a minute quantity of acetic acid with the purified adipic acid becomes a problem, but this problem can be solved by carrying out recrystallization of the adipic acid from water in accordance with this invention. Accordingly, the decision as to whether or not to recover the adhering acetic acid in the above described manner may be made on the basis of the balance between acetic acid loss and recovery cost.

The nitric-acid treatment is preferably carried out in the following manner. First, the raw adipic acid is dissolved in nitric acid of a suitable concentration, for example, from 5 to 60 percent by weight, preferably from 8 to 30 percent by weight. This adipic-acid solution is maintained at a temperature of from 90 to 150° C., preferably from 100 to 140° C. for a period of from 10 minutes to 5 hours, preferably from 15 minutes to 3 hours, with or without agitation. In this treatment, the adipic acid is used in a quantity such that its concentration in the aqueous nitric acid will be from 2 to 70 percent by weight, preferably from 10 to 60 percent by weight. The resulting solution is then supersaturated by any convenient method thereby to separate out the adipic acid.

This nitric-acid treatment can be carried out repeatedly two or more times. The partially purified adipic acid obtained by the nitric-acid treatment is crystallized out of the aqueous nitric acid in this manner and is preferably sent to the succeeding step of recrystallization from water. By crystallizing out the adipic acid from a sufficiently dilute aqueous nitric acid, it is possible to attain beforehand to some extent the effect anticipated in the step of recrystallization from water.

The recrystallization from water can be accomplished in accordance with an ordinary known method, which can be carried out repeatedly two or more times. The purified adipic acid thus obtained by crystallization from water can be caused in a moist state to react directly with hexamethylene diamine. Furthermore, since coloration substances have previously been removed thoroughly from this adipic acid, dried adipic acid can be readily produced therefrom by a simple procedure such as heat drying.

In order to indicate still more fully the nature and utility of the invention, the following examples of specific practice constituting preferred embodiments of the invention and results are set forth, it being understood that these examples are presented as illustrative only and that they are not intended to limit the scope of the invention.

EXAMPLE I

A 10-liter, titanium-lined autoclave is charged with 2 kg. of a mixture of cyclohexanone and cyclohexanol, 4 kg. of acetic acid, 0.5 gram (g.) of cobalt acetate, 0.5 g. of manganese acetate, and 0.5 g. of copper acetate. The charge is then caused to undergo oxidation for 3 hours at a reaction temperature of 85° C. and under a reaction pressure of 5 kg./cm.$^2$, gauge, as air is caused to flow thereinto at a flowrate of 1,200 liters per hour.

The liquor thus formed is cooled to 20° C. thereby to precipitate out crystals. These crystals are separated by centrifugal separation and washed with 2 liters of acetic acid, whereupon 2 kg. of raw adipic acid crystals in moist state are obtained.

These raw adipic acid crystals are dried under reduced pressure at 80° C. for three hours, and the resulting adipic acid is purified in the succeeding purification process. In instances of actual practice, the ratio (by weight) of the quantity of the recrystallization solvent and the adipic acid was 2:1 in all instances.

The quality of the adipic acid thus prepared was determined by maintaining the adipic acid at 250° C. in a molten state for 2 hours and measuring the APHA chromaticity.

Purification processes (I–1) The adipic acid is recrystallized once with water, centrifugally separated, and washed with an equal quantity of water.

(I–2) The process of (I–1) above except for the use of acetic acid in place of water.

(I–3) The adipic acid is dissolved in 10-percent nitric acid, and, after the solution has been maintained at 105° C. for 30 minutes, adipic acid is recrystallized out and then washed with an equal quantity of water.

(I–4) The crystals obtained by the process of (I–3) above are further recrystallized with water and then washed with an equal quantity of water.

(I–5) The adipic acid is dissolved in 10-percent nitric acid, and, after the solution has been maintained at 150° C. for 3 hours, adipic acid is recrystallized out and then washed with an equal quantity of water.

(I–6) The crystals obtained by the process of (I–5) above are further recrystallized with water and then washed with an equal quantity of water.

EXAMPLE II

Raw adipic acid crystals prepared by the procedure set forth in Example I are purified without a prior step of heating and drying thereof.

Purification processes (II–1) through (II–6), inclusive, are the same as processes (I–1) through (I–6) of Example I.

(II–7) The adipic acid is dissolved in 10-percent nitric acid, and, after the solution has been maintained at 80° C. for 1 hour, adipic acid is recrystallized out and washed with an equal quantity of water. The crystals thus obtained are further recrystallized from water, and the resulting crystals are washed with an equal quantity of water.

EXAMPLE III

A 500-cc., titanium-lined autoclave is charged with 200 g. of cyclohexane and 0.02 g. of manganese naphthenate. With the charge maintained at a reaction temperature of 150° C. under a reaction pressure of 30 kg./cm.$^2$, gauge, air is blown thereinto for 6 hours at a flowrate of 100 liters/hour.

As a result, a liquor is formed and separates into two layers, the bottom containing crystals. By applying centrifugal-force separation to this layer, 50 g. of raw crystals are obtained. These crystals are recrystallized from acetic acid. The crystals thus obtained are purified by any of the following processes.

Purification processes (III–1) The process of II–4) of Example II except that the crystals are not dried.

(III–2) The adipic acid is dried under reduced pressure at 80° C. for 3 hours and then purified according to process (II–4) of Example II.

The results of the above three examples are set forth in the following table.

| Example and purification process No. | Purification process | Heated chromaticity (APHA) | Residual nitric acid ions (p.p.m.) | Comparison example for reference (CE) |
|---|---|---|---|---|
| I-0 | (No purification) | ))500 | | CE |
| I-1 | Recrystallization, water | >500 | | CE |
| I-2 | Recrystallization, acetic acid | >500 | | CE |
| I-3 | Recrystallization, nitric acid | >500 | 222 | CE |
| I-4 | Recrystallization, nitric acid, plus recrystallization, water | 400 | <10 | CE |
| I-5 | Nitric-acid treatment under pressure | >500 | 239 | CE |
| I-6 | Nitric-acid treatment under pressure plus recrystallization, water | 275 | <10 | CE |
| II-0 | (No purification) | ))500 | | CE |
| II-1 | Recrystallization, water | >500 | | CE |
| II-2 | Recrystallization, acetic acid | >500 | | CE |
| II-3 | Recrystallization, nitric acid | 300 | 218 | CE |
| II-4 | Recrystallization, nitric acid plus recrystallization, water | 70 | >10 | CE |
| II-5 | Nitric-acid treatment under pressure | 250 | 230 | |
| II-6 | Nitric-acid treatment under pressure plus recrystallization, water | 70 | <10 | |
| II-7 | Recrystallization, nitric acid plus recrystallization, water | 500 | <10 | CE |
| III-1 | No drying | 80 | <10 | |
| III-2 | Drying | <500 | <10 | CE |

We claim:

1. A purification process for preparing polymer grade adipic acid from the raw crystals of adipic acid containing resin and color-forming impurities prepared by the direct air-oxidation of starting materials selected from the group consisting of cyclohexane, cyclohexanol, cyclohexanone or mixtures thereof which comprises the steps of separating said raw crystals from the oxidation reaction product mixture by crystallizing adipic acid from said product mixture and drying said raw crystals by heating at temperatures below 75° C., heating said raw crystals in an aqueous nitric acid solution at temperatures in the range 90–150° C. to decompose said impurities and then recrystallizing said adipic acid from water.

2. A process for purifying adipic acid according to claim 1 in which said oxidation is carried out in a monobasic lower fatty acid in the presence of a catalyst comprising a variable-valence metal salt.

3. A process for purifying adipic acid according to claim 1 said raw crystals are washed with water or acetic acid prior to said drying and the residual water or acetic acid is removed from said raw crystals during the drying step at a temperature below 75° C.

4. A process for purifying adipic acid according to claim 3 which comprises removing air-oxidation process impurities by washing said raw crystals of adipic acid with acetic acid.

5. A process for purifying adipic acid according to claim 1 which comprises recrystallization of said raw crystals of adipic acid from acetic acid prior to drying.

6. A process for purifying adipic acid according to claim 1 in which said nitric-acid treatment comprises dissolving said raw crystals of adipic acid in an aqueous nitric acid of a concentration of from 50 to 60 percent by weight.

References Cited

UNITED STATES PATENTS 3,365,490 1/1968 Arthur et al. _____ 260—537 P
391,311 4/1943 Speer _____ 260—537 P
2,713,067 7/1955 Hamblet et al. ____ 260—537 P VIVIAN GARNER, Primary Examiner U.S. Cl. X.R.

260—531 R, 533 C